United States Patent Office 3,437,523
Patented Apr. 8, 1969

3,437,523
METHOD OF MAKING A BATTERY ELECTRODE CONTAINING META-DINITROBENZENE AND A METALLIC HALIDE
Joseph C. Duddy, Trevose, Pa., and William J. Dermody, Titusville, N.J., assignors to ESB Incorporated, a corporation of Delaware
No Drawing. Filed Aug. 29, 1967, Ser. No. 663,962
Int. Cl. H01m 41/00, 43/00, 15/00
U.S. Cl. 136—20
6 Claims

ABSTRACT OF THE DISCLOSURE

Metallic halide depolarizers are added to a solution containing meta-dinitrobenzene (MDB), the resultant paste is applied to a grid, and the solvent is removed. Alternatively the metallic halides may be mixed into molten MDB together with conductor additives and the resultant composition applied to a grid.

CROSS-REFERENCES TO RELATED APPLICATIONS

This application is related to the following others:
(1) "Method of Making Battery Electrodes Using Molten Meta-Dinitrobenzene," Ser. No. 663,961, Joseph C. Duddy; and
(2) "Battery Electrode Having Thin Deposit of Meta-Dinitrobenzene on Graphite Fabric and a Method for Making It," Ser. No. 663,974, Joseph C. Duddy.
All three applications have common filing dates and common ownership.

BACKGROUND OF THE INVENTION

Electrodes containing metallic halide active materials dispersed in a binder have been in use for many years. Typical of the binders used in the past are polyvinyl alcohol, methyl cellulose, polyethylene, and polystyrene, all being unreactive from an electrochemical standpoint.

Recently, interest has developed in the organic compound meta-dinitrobenzene (MDB) for use as an active material or depolarizer in electrodes, and the MDB has been compressed under high pressure into grids to construct electrodes. (The above identified related applications discuss other methods of applying MDB to grids.)

SUMMARY OF THE INVENTION

With this invention MDB is used as a binder for metallic halides; the binder-metallic halide composition is then applied to a grid. The composition may be made by mixing a solution containing MDB with the powdered halides to form a paste, or alternatively the halides are displaced in molten MDB (along with conductors if desired). The resulting electrode is one in which both the metallic halide and the binder are electrochemically active. As an additional advantage the MDB acts to provide a waterproof coating over the metallic halide particles and hence counteracts the adverse effects presently felt when a halide such as $Cu_2Cl_2$ is stored in a high humidity environment.

DESCRIPTION OF THE PREFERRED EMBODIMENT

This invention concerns methods of applying a MDB-metallic halide composition to a grid to construct a battery electrode.

According to one approach, the composition may be obtained by dissolving MDB in any suitable solvent; the preferred solvents are toluene or benzene but others such as ether or chloroform may also be used. The solution is mixed with the metallic halide to form a paste, and the paste is then applied to the grid. Finally the solvent is removed, leaving the metallic halide deposited in a binder of MDB on the grid.

According to another approach, the composition may be obtained by dispersing the metallic halide into molten MDB.

A conductor such as carbon or graphite may be added in any desired amount if it is necessary to improve the conductivity of the composition. The conductor may be contained in the solution of the dissolved MDB or in the dissolved MDB. The resulting composition containing molten MDB as thermoplastic binder may then be applied to the grids in any convenient manner.

Besides providing a binder which itself has electrochemical activity, the MDB is useful in protecting against the adverse effects present felt when the metallic halide is stored in a high humidity environment. MDB has been used as a common ingredient of shoe polish, and in the battery electrode it provides protection against moisture to the metallic halide in much the same way that it protects against rain when applied to shoes.

This invention does not essentially consist of novel metallic halides. The metallic halides which are conventionally used in electrodes, such as those of copper, silver, mercury, or lead, may be used.

Any conventional grid, such as a cast lead-antimony alloy or an expanded metal, may be used with this invention.

To illustrate the utility of an electrode made according to this process, a paste was prepared using a saturated solution of MDB dissolved in toluene and $PbCl_2$ in the ratio, by weight, of 6½ to 8 parts MDB to 100 parts $PbCl_2$. The resultant paste was applied as an 0.057 inch deep deposit into a lead antimony alloy grid. When discharged in seawater against a magnesium anode at a current drain of 33 ma./sq. in., the initial voltage was 1.01 volts and at the end of 5 hours the voltage was 0.87 volt. An electrode made using the paste of MDB saturated toluene and $CuCl_2$ in the ratio, by weight, of 6½ to 8 parts MDB to 100 parts $CuCl_2$ and having a 0.030 inch thickness pasted into an expanded nickel grid was discharged in seawater against a magnesium anode at a current drain of 44 ma./sq. in.; the initial voltage of 1.35 volts remained nearly constant for approximately 1½ hours, following which the voltage decreased sharply.

We claim:
1. A method of making a battery electrode consisting of applying a composition containing meta-dinitrobenzene and a metallic halide to a grid.
2. The method of claim 1 in which the composition is obtained by dissolving meta-dinitrobenzene in a solvent, the resulting solution is mixed with the metallic halide to form a paste, the paste is applied to the grid, and the solvent is subsequently removed.
3. The method of claim 2 in which the meta-dinitrobenzene is dissolved in toluene.
4. The method of claim 2 in which the meta-dinitrobenzene is dissolved in benzene.
5. The method of claim 1 in which the composition is obtained by dispersing the metallic halide into molten meta-dinitrobenzene.
6. The method of claim 1 in which a conductor is mixed with the meta-dinitrobenzene-metallic halide composition.

(References on following page)

References Cited
UNITED STATES PATENTS
2,855,452  10/1958  Morehouse et al. ----- 136—120
3,025,336  3/1962  Bartosh et al.
3,060,255  10/1962  Lozier ------------- 136—137

WINSTON A. DOUGLAS, *Primary Examiner.*

C. F. LE FEVOUR, *Assistant Examiner.*

U.S. Cl. X.R.

136—120, 137